(12) United States Patent
Nagesh et al.

(10) Patent No.: US 12,099,720 B2
(45) Date of Patent: Sep. 24, 2024

(54) IDENTIFICATION OF STORAGE DEVICES DURING SYSTEM INSTALLATION

(71) Applicant: Dell Products L.P., Round Rock, TX (US)

(72) Inventors: Pavan Nagesh, Bengaluru (IN); Shantanu Joshi, Bangalore (IN); Mahesh Thotadhar, Davanagere (IN); A Ashok Kumar Reddy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 78 days.

(21) Appl. No.: 18/162,967

(22) Filed: Feb. 1, 2023

(65) Prior Publication Data

US 2024/0256122 A1    Aug. 1, 2024

(51) Int. Cl.
*G06F 3/06* (2006.01)

(52) U.S. Cl.
CPC .......... *G06F 3/0604* (2013.01); *G06F 3/0632* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 7,272,727 B2* | 9/2007 | Mimatsu | ................. | G06F 21/78 380/278 |
| 7,757,009 B2* | 7/2010 | Krantz | .................... | H04L 69/22 710/5 |
| 8,880,812 B1* | 11/2014 | Walch | ................... | G06F 3/0613 711/149 |
| 2007/0233868 A1* | 10/2007 | Tyrrell | ................ | H04L 67/1097 709/226 |

* cited by examiner

*Primary Examiner* — Kevin Verbrugge
(74) *Attorney, Agent, or Firm* — DALY, CROWLEY, MOFFORD & DURKEE, LLP (57) ABSTRACT

In one aspect, a computer-implemented method includes: identifying a plurality of storage devices accessible to a node of a computer cluster, the storage devices being identified as not having labels; determining one or more attributes of individual ones of the storage devices; determining, by the node, intended uses of the storage devices based on comparing the determined attributes to attributes defined within a configuration file; and generating labels for the storage devices based in least in part on the determined intended uses; and applying the labels to the storage devices.

20 Claims, 5 Drawing Sheets

IDENTIFICATION OF STORAGE DEVICES DURING SYSTEM INSTALLATION

BACKGROUND

A storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

Distributed storage systems, along with other types of distributed computing systems, may be hosted within cloud computing environments and/or an on-premises data centers. A distributed computing system can include various types of hardware and software components. Hardware components can include physical and/or virtual machines, storage devices, networking hardware, etc. Software components can include virtualization software, operating systems (OSs), services, middlewares, applications, etc. configured to run on and utilize physical/virtual hardware.

A computer cluster (or simply "cluster") is type of distributed computing system in which multiple physical and/ or virtual machines (or "nodes") are networked together and configured to execute common types of tasks. The multiple nodes can be controlled/scheduled to work together so that they can be viewed as a single system.

SUMMARY

According to one aspect of the disclosure, a computer-implemented method includes: identifying a plurality of storage devices accessible to a node of a computer cluster, the storage devices being identified as not having labels; determining one or more attributes of individual ones of the storage devices; determining, by the node, intended uses of the storage devices based on comparing the determined attributes to attributes defined within a configuration file; generating labels for the storage devices based in least in part on the determined intended uses; and applying the labels to the storage devices.

In some embodiments, the method can further include: partitioning and formatting the storage devices using settings specified within the configuration file. In some embodiments, the generating of the labels for the storage devices may include generating labels that indicate the determined intended uses in addition to devices labels and partition labels specified within the configuration file.

In some embodiments, the determining of the one or more attributes of individual ones of the storage devices can include determining sizes of individual ones of the storage devices, wherein the determining of the intended uses of the storage devices includes matching the determined sizes of the storage devices to sizes specified within the configuration file. In some embodiments, at least two of the storage devices have a same size, wherein the least two of the storage devices are matched based on an order in which they were identified by the node.

In some embodiments, the determining of the one or more attributes of individual ones of the storage devices includes determining World Wide Names (WWNs) of individual ones of the storage devices, wherein the determining of the intended uses of the storage devices includes matching the determined WWNs of the storage devices to WWNs specified within the configuration file.

The method can further include receiving, by the node, a request to identify storage devices that have a given intended use, and identifying one or more move the storage devices accessible to the node having the given intended use based on the applied labels.

According to another aspect of the disclosure, an apparatus includes a processor a non-volatile memory storing computer program code. The computer program code, when executed on the processor causes the processor to execute a process corresponding to any of the aforementioned method embodiments.

According to another aspect of the disclosure, a non-transitory machine-readable medium encodes instructions that when executed by one or more processors cause a process to be carried out. The process can correspond to any of the aforementioned method embodiments.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the following claims.

BRIEF DESCRIPTION OF THE DRAWINGS

The manner of making and using the disclosed subject matter may be appreciated by reference to the detailed description in connection with the drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

Virtual/physical machines may be configured to access one or more storage devices over a bus, such as a Parallel ATA (PATA), Serial ATA (SATA), SCSI, Serial Attached SCSI (SAS), or Fibre Channel bus. In some cases, different storage devices may be provided for different uses/purposes by a given node. For example, a particular node may be configured to access one storage device for loading an operating system (OS) and accessing other data during bootup, another to load application images, another to store user data (or "cluster data"), etc.

Storage devices, or individual partitions thereof, can be mounted (or "mapped") to appropriate paths within a node's file system structure. For example, a partition that stores boot data may be mounted to "/boot" whereas a device that stores user data may be mounted to "/var/data." This allows applications, services, and other software components running on a node to perform input-output (IO) operations using well-defined file system paths and without knowledge of the underlying device names.

One approach to mounting devices/partitions is based on the names that are automatically assigned to devices by the OS. For example, in the case of Linux-based systems, storage devices may be assigned names such as "/dev/sda1" or "/dev/nvme0n1." In more detail, storage devices can be named under/dev according to the type of device followed by a letter signifying the order in which they were detected by the system. A storage device can be divided into multiple logical storage units known as partitions. Each partition will show up under/dev as a separate device node. A number after the device letter signifies the number of the partition. For example, the names "/dev/sda1" and "/dev/sda2" may refer to the first and second partition of the first PATA device. The name assigned by the OS to a particular storage device may change across reboots, particularly in the case of multipath-enabled storage systems where the order of device detection can change depending on which of multiple paths (or "ports") are used.

Another approach to mounting devices/partitions is based on labels. In some systems, such as Linux-based systems, a storage device may be assigned one or more labels that can subsequently be used to mount the device or individual partitions within a node's file system structure (e.g., using the "/etc/fstab" file system table on Linux systems). In some cases, the "e2label" command can be used to label a storage device or a partition thereof.

In any case, it may be necessary and/or useful to determine a mapping between devices and intended uses/purposes during node installation, and persistently maintain this mapping for entire lifecycle of the host.

Storage devices (or logical unit numbers, LUNs) may be initially provided as "raw" devices, meaning that they are neither partitioned nor formatted. Thus, although a node may have access to one or more storage devices (i.e., the devices may be "visible" to the node), the node may not be able to determine how particular devices are intended to be used (i.e., the purpose of those devices). Typically, labels can only be assigned to storage devices that have been partitioned and, thus, cannot be pre-assigned to raw devices. During installation of an individual virtual/physical machine or a cluster environment having many nodes, it may be necessary to identify the purposes of a different storage devices such that they can be correctly partitioned, formatted, and labeled to allow subsequent mounting and use by nodes.

There is a need for structures and techniques for determining the purpose of unformatted storage devices to facilitate automated installation of individual machines and computer clusters.

Disclosed herein are computer-implemented structures and techniques for determining the purpose of "raw" storage devices and applying meaning labels thereto to facilitate automated installation of individual machines and computer clusters. Some embodiments can enable the automated identification, partitioning, and formatting of storage devices based on a text-based configuration file that can be readily by storage administrators without requiring code changes. Disclosed embodiments can be applied to various types of storage devices (e.g., SCSI devices, NVMe devices, storage arrays, local devices, networked devices, etc.) and various types of installation methods (e.g., network boot-based installs, optical disk-based installs, etc.). Structures and techniques disclosed herein can be utilized on standalone physical/virtual machines and computer clusters having arbitrary numbers of nodes.

Figure 1:
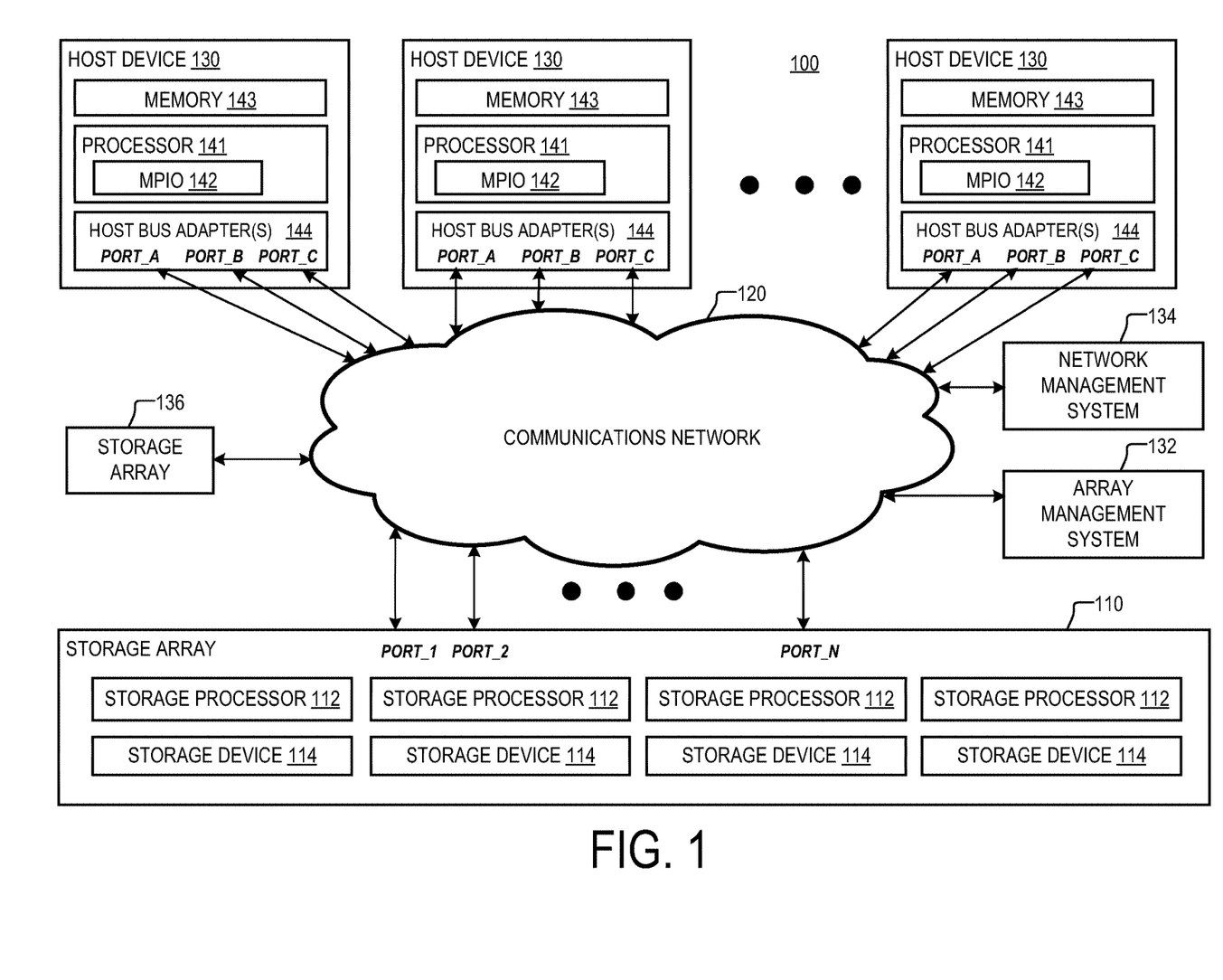
FIG. 1 is a block diagram of an illustrative storage system within which embodiments of the present disclosure may be utilized.

FIG. 1 is a diagram of an example of a storage system 100 within which embodiments of the present disclosure may be utilized. As illustrated, system 100 may include a storage array 110, a communications network 120, a plurality of host devices 130, an array management system 132, a network management system 134, and a storage array 136.

The storage array 110 may include a plurality of storage processors 112 and a plurality of storage devices 114. Each of the storage processors 112 may include a computing device that is configured to receive I/O requests from any of the host devices 130 and execute the received I/O requests by reading or writing data to the storage devices 114. In some implementations, each of the storage processors 112 may have an architecture that is the same or similar to the architecture of the computing device 500 of FIG. 5. The storage processors 112 may be located in the same geographic location or in different geographic locations. Similarly, storage devices 114 may be located in the same geographic location or different geographic locations. Each of the storage devices 114 may include any of a solid-state drive (SSD), a non-volatile random-access memory (nvRAM) device, a non-volatile memory express (NVME) device, a hard disk (HD), and/or any other suitable type of storage device. In some implementations, the storage devices 114 may be arranged in one or more Redundant Array(s) of Independent Disks (RAID) arrays. The communications network 120 may include one or more of the Internet, a local area network (LAN), a wide area network (WAN), a fibre channel (FC) network, and/or any other suitable type of network.

Each of the host devices 130 may include a laptop, a desktop computer, a smartphone, a tablet, an Internet-of-Things device, and/or any other suitable type of electronic device that is configured to retrieve and store data in the storage arrays 110 and 136. Each host device 130 may include a memory 143, a processor 141, and one or more host bus adapters (HBAs) 144. Memory 143 may include any suitable type of volatile and/or non-volatile memory, such as a solid-state drive (SSD), a hard disk (HD), a random-access memory (RAM), a Synchronous Dynamic Random-Access Memory (SDRAM), etc. The processor 141 may include any suitable type of processing circuitry, such as a general-purpose process (e.g., an x86 processor, a MIPS processor, an ARM processor, etc.), a special-purpose processor, an application-specific integrated circuit (ASIC), a field programmable gate array (FPGA), etc. Each of the HBAs 144 may be a circuit board or integrated circuit adapter that connects a respective one of the host devices 130 to the storage array 110 (and/or storage array 136). In other words, each of the HBAs 144 may include a communications interface for connecting to the communications network 120, storage array 110 and/or storage array 136. Although in the example of FIG. 1 each of the host devices 130 is provided with at least one HBA 144, alternative implementations are possible in which the each of the host devices is provided with another type of communications interface, in addition to (or instead of) an HBA. The other type of communications interface may include one or more of an Ethernet adapter, a WiFi adapter, a local area network (LAN) adapter, etc.

Each processor 141 may be configured to execute a multi-path I/O (MPIO) driver 142. The MPIO driver 142 may comprise, for example, PowerPath™ drivers from Dell EMC™, and/or other types of MPIO drivers that are arranged to discover available communications paths any of the host devices 130 and the storage array 110. The MPIO driver 142 may be configured to select I/O operations from any of the I/O queues of the host devices 130. The sources of the I/O operations stored in the I/O queues may include respective processes of one or more applications executing on the host devices 130.

The HBA 144 of each of the host devices 130 may include one or more ports. Specifically, in the example of FIG. 1, the HBA 144 of each of the host devices 130 includes three ports, which are herein enumerated as "port A", "port B", and "port C". Furthermore, storage array 110 may also include a plurality of ports. In the example of FIG. 1, the ports in the storage array 110 are enumerated as "port 1", "port 2," and "port N", where N is a positive integer greater than 2. Each of the ports in the host devices 130 may be coupled to one of the ports of the storage array via a corresponding network path. The corresponding network path may include one or more hops in the communications network 120. Under the nomenclature of the present disclosure, a network path spanning between an HBA port of one of host devices 130 and one of the ports of the storage array 110 is referred to as a "network path of that host device 130".

Figure 5:
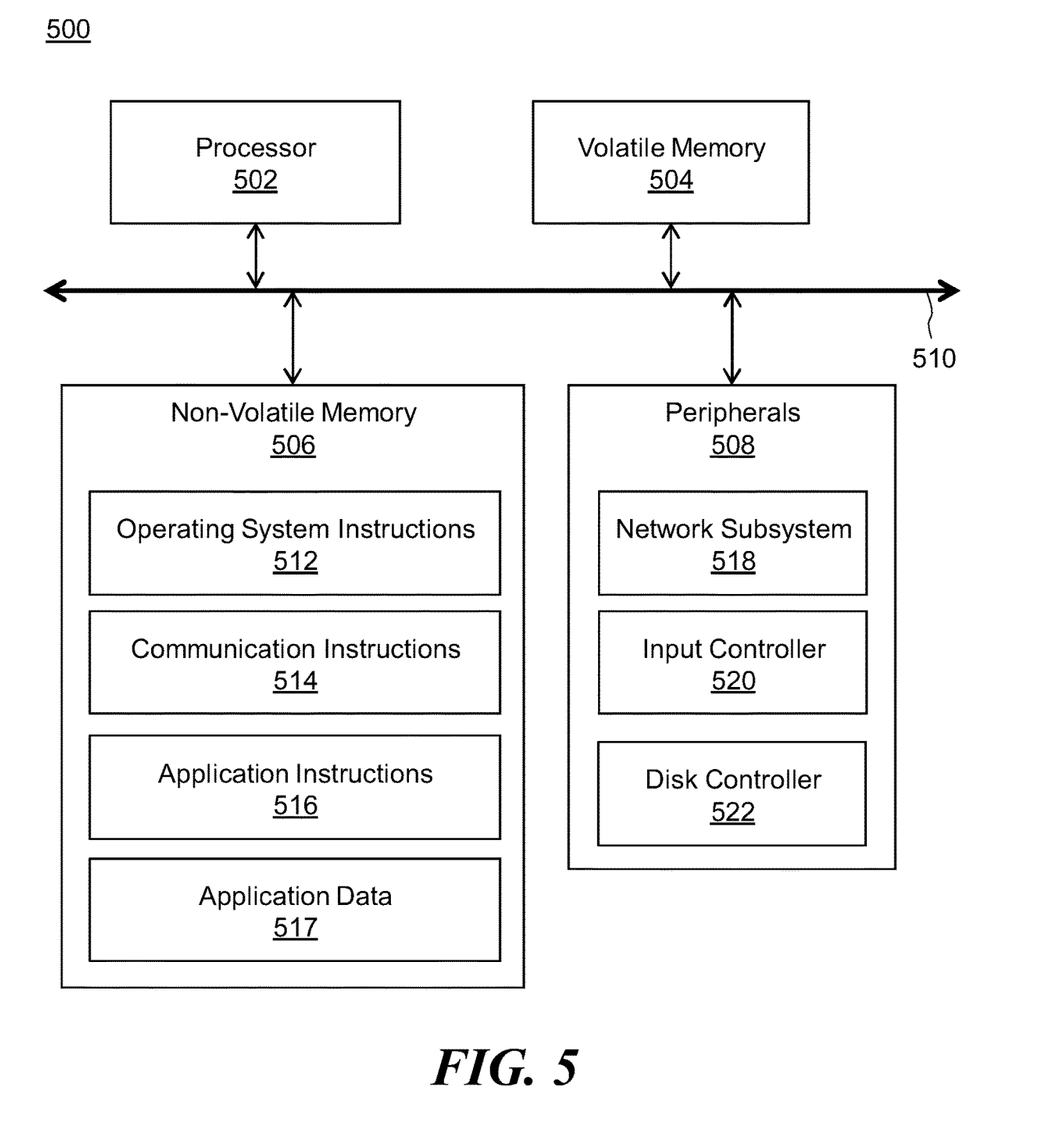
FIG. 5 is a block diagram of a processing device on which methods and processes disclosed herein can be implemented, according to some embodiments of the disclosure.

Array management system 132 may include a computing device, such as the computing device 500 of FIG. 5. The array management system 132 may be used by a system administrator to re-configure the storage array 110, e.g., when degraded performance of the storage array 110 is detected.

Network management system 134 may include a computing device, such as the computing device 500 of FIG. 5. The network management system 134 may be used by a network administrator to configure the communications network 120 when degraded performance of the communications network 120 is detected.

The storage array 136 may be the same or similar to the storage array 110. The storage array 136 may be configured to store the same data as the storage array 110. The storage array 136 may be configured to operate in either active-active configuration with the storage array 110 or in active-passive configuration. When storage arrays 110 and 136 operate in active-active configuration, a write request to either of storage arrays 110 and 136 is not acknowledged back to the sender until the data associated with the write request is written to both of the storage arrays 110 and 136. When storage arrays 110 and 136 are operated in active-passive configuration, a write request to a given one of the storage arrays 110 and 136 is acknowledge for as long the data associated with write request is written to the given one of the storage arrays 110 and 136 before the writing to the other one of the storage arrays is completed.

Figure 2:
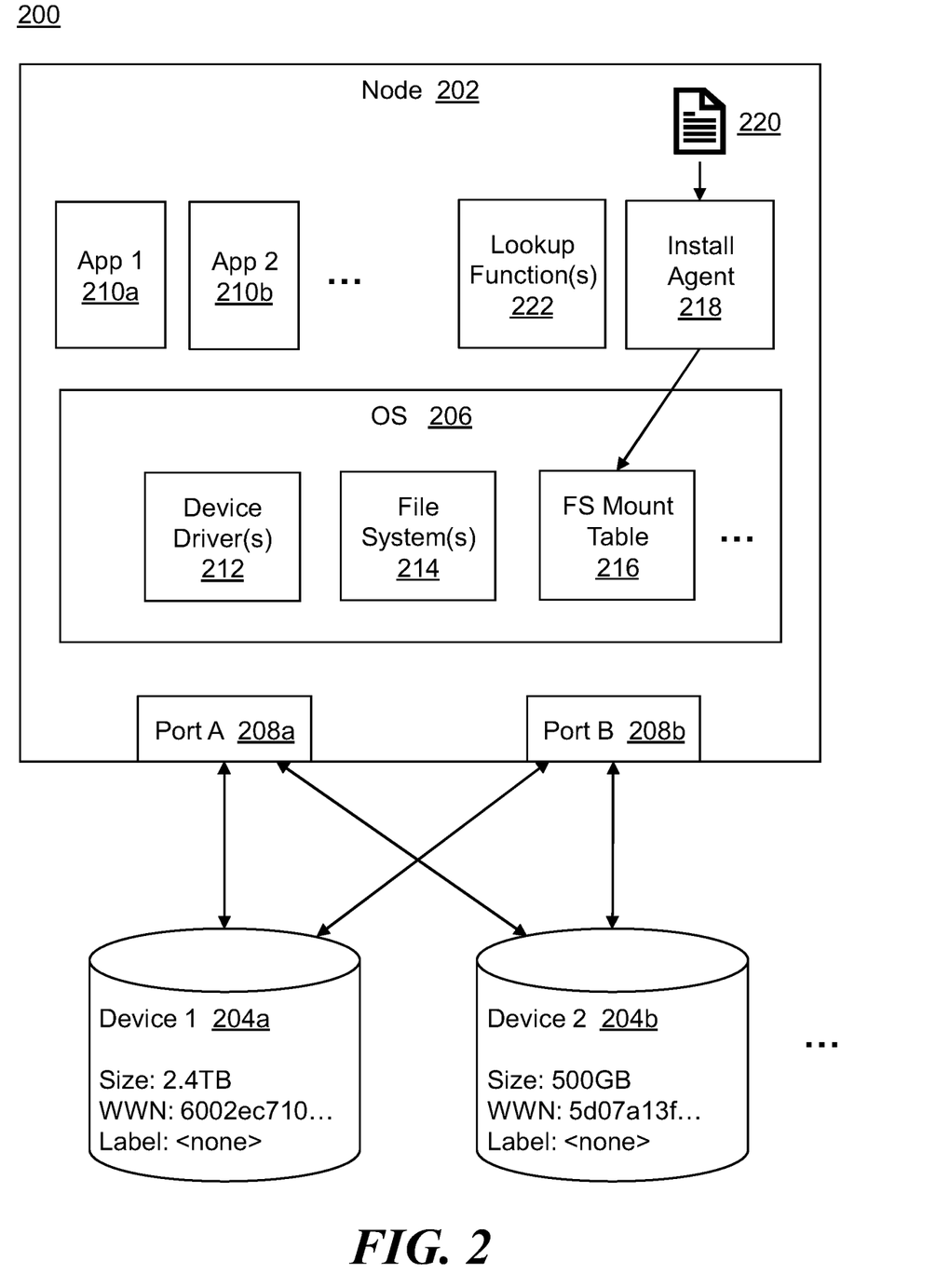
FIG. 2 is a block diagram of an illustrative computing environment configured to identify storage devices during system installation, according to some embodiments of the disclosure.

FIG. 2 shows an example of a computing environment with multipath-enabled storage, according to some embodiments of the disclosure. Illustrative computing environment 200 includes a node 202 that can access a plurality of storage devices 204a, 204b, etc. (204 generally) via a communications network (not shown). Node 202 can be configured to execute a multi-path I/O (MPIO) driver configured to discover available communications paths between node 202 and storage devices 204 via ports 208a, 208b. As illustrated, there may be at least two paths between node 202 and individual ones of storage devices 204. In some cases, node 202 may be the same as or similar to a host device 130 of FIG. 1 and storage devices 204 may be the same as or similar to storage devices 114 of FIG. 1 (i.e., storage devices 204 may be part of a storage array).

The illustrative node 202 can include an OS 206 that provides one or more device drivers 212 (e.g., SCSCI, NVMe, PATA, SATA, etc. device drivers), one or more file system implementations 214 (e.g., implementations of EXT2, EXT3, ZFS, BTRFS, NFS, etc.), and a file system mount table 216, among various other structures and functions not discussed herein. In some cases, device drivers 212 can also include an MPIO driver. One or more applications 210a, 210b, etc. (210 generally) running on node 202 can utilize system calls provided by OS 206 to perform I/O operations on storage devices 204.

File system mount table 216 can include a persistent mapping between storage devices 204 and paths within the node's file system structure. In the case of a Linux-based OS, file system mount table 216 may correspond to the "/etc/fstab" system file. In another OS, file system mount table 216 may correspond to an equivalent mechanism provided by that OS. At boot up, OS 206 can use the file system mount table 216 to mount different storage devices 204 to different file system paths, thereby allowing applications 210 to perform I/O operations for a particular purpose using well-defined file system paths and without knowledge of the underlying storage devices.

During boot up, OS 206 may detect the one or more storage devices 204 accessible by node 202 and assign them device names based on the order in which they are detected. In the case of a multipath-enabled storage, such as illustrated in FIG. 2, the device name assigned by the OS to a given storage device 204 may vary depending on which communications paths are available during boot. Thus, it may be preferable to use file system labels within file system mount table 216, rather than device names. However, during the initial setup/installation of node 202, storage devices 204 may be provided as "raw" devices, meaning that they are neither partitioned nor formatted and thus cannot be pre-assigned labels.

To facilitate automated installation of node 202 (or many such nodes in a cluster), embodiments of the present disclosure provide an installation agent 218 configured to automatically determine the intended purpose of different ones of the storage devices 204 using a configuration file 220 and attributes of the storage devices 204. For example, installation agent 218 may use a storage device's size (e.g., capacity) and/or World Wide Name (WWN) to determine its intended purpose. WWN is a unique identifier that can be assigned to a LUN at the time it is provisioned. After determining the intended purpose of a given storage device 204, installation agent 218 can partition and/or format the device as specified in configuration file 220, generate a label for the device that indicates the intended purpose, and automatically apply that label to the device 204. In some cases, installation agent 218 can automatically update the file system mount table 216 to map the device's label to a well-defined file system path associated with the device's intended purposes. For example, if the purpose of the device is for loading the OS and other data during boot, then installation agent 218 may generate a label that includes the term "Boot" and may update table 216 such that this device is mounted to the "/boot" file system path.

In some embodiments, installation agent 218 may generate device labels using a hierarchical naming scheme, such as "<PurposeLabel>-<DeviceLabel>-<PartitionLabel>," where the values of "PurposeLabel," "DeviceLabel," and "PartitionLabel" can be defined within configuration file 220 as illustrated below. Hierarchical labelling can be used to uniquely identify a device/partition across reboots.

Configuration file 220 may be formatted using JavaScript Object Notation (JSON), as in the following example, using another text-based format such as Extensible Markup Language (XML).

```
{
    "Method": "Size",
    "DeviceDetails": [
      {
        "Purpose": "RootDevice",
        "Label": "RootDevice",
        "Count": "1",
        "Devices": [
          {
            "Size": "2.4T",
            "WWN": "6002ec710 . . . ",
            "Priority": "P1",
            "DeviceLabel": "RootDevice",
            "Partitions": [
              {
                "PartitionName": "Partition1",
                "PartitionID": "1",
                "Size": "2T",
                "FS": "btrfs",
                "PartitionLabel": "Boot"
              },
              {
                "PartitionName": "Partition2",
                "PartitionID": "2",
                "Size": "4G",
                "FS": "btrfs",
                "PartitionLabel": "Root"
              },
            ]
          }
        ]
      },
      {
        "Purpose": "ClusterDevice",
        "Label": "ClusterDevice",
        "Count": "2",
        "Devices": [
          {
            "Size": "500G",
            "WWN": "5d07a13f . . . ",
            "Priority": "P5",
            "DeviceLabel": "ClusterDevice1",
            "Partitions": [
              {
                "PartitionName": "Partition1",
                "PartitionID": "1",
                "Size": "200G",
                "FS": "btrfs",
                "PartitionLabel": "ClusterSharedLabel1"
              },
              {
                "PartitionName": "Partition2",
                "PartitionID": "2",
                "Size": "300G",
                "FS": "btrfs",
                "PartitionLabel": "ClusterSharedLabel2"
              }
            ]
          },
          {
            "Size": "800G",
            "WWN": "01a123fb . . . ",
            "Priority": "P2",
            "DeviceLabel": "ClusterDevice2",
            "Partitions": [
              {
                "PartitionName": "Partition1",
                "PartitionID": "1",
                "Size": "800G ",
                "FS": "btrfs",
                "PartitionLabel": "ClusterSharedLabel1"
              }
            ]
```

-continued

```
          }
        ]
      }
    ]
}
...
```

As can be seen in the preceding example, configuration file 220 can specify a method ("Method") to use in identifying storage devices 204 along with a list of device details ("DeviceDetails"). In some cases, the method can be one of "Size" or "WWN." If the method is specified as "WWN," then a "WWN" value should be specified for each device within the device details. If the method is specified as "Size," then a size/capacity of each device should be specified for each device within the device details. A process for applying each of these methods is described below in the context of FIG. 4.

Still referring to preceding example, configuration file 220 can group devices ("Devices") according to their intended purpose ("Purpose"). For example, a single device is specified for use as a "RootDevice" whereas two devices are specified for use as "ClusterDevice[s]." For each device, configuration file 220 can specify the devices size/capacity ("Size") and/or its WWN ("WWN"), along with a priority ("Priority"), a label ("DeviceLabel"), and one or more partitions ("Partitions"). For each partition, configuration file 220 can specify a name ("PartitionName"), a numeric identifier ("PartitionID"), a size ("Size"), a file system type ("FS"), and a label ("PariitonLabel"). Installation agent 218 can use the partition information to create and format partitions on an identified storage device.

In some embodiments, installation agent 218 may be provided as a software component that runs on node 202 (and, in the case of a cluster, runs on each of several different nodes). In other embodiments, installation agent 218 may run external to node 202.

In some embodiments, and as shown in FIG. 2, node 202 may further include one or more lookup functions 222 to identify storage devices/partitions after the have been labeled (e.g., post installation). Lookup functions 222 can include scripts, applications, libraries, or other software components configured to accept, as input, an intended purpose (e.g., a string such as "ClusterDevice") and to output one or more information identifying a storage device/partition associated with that purpose. For example, a given lookup function 222 can retrieve labels from a set of devices/partitions visible to node 202 and then parse those labels (e.g., hierarchical labels) to determine if they match the intended purpose. Such lookup functions can be used, for example, during mounting of devices/partitions by node 202 post installation. Thus, in some examples, lookup functions 222 may be used to update the file system mounting table 216, in place of or in addition to installation agent 218.

Figure 3:
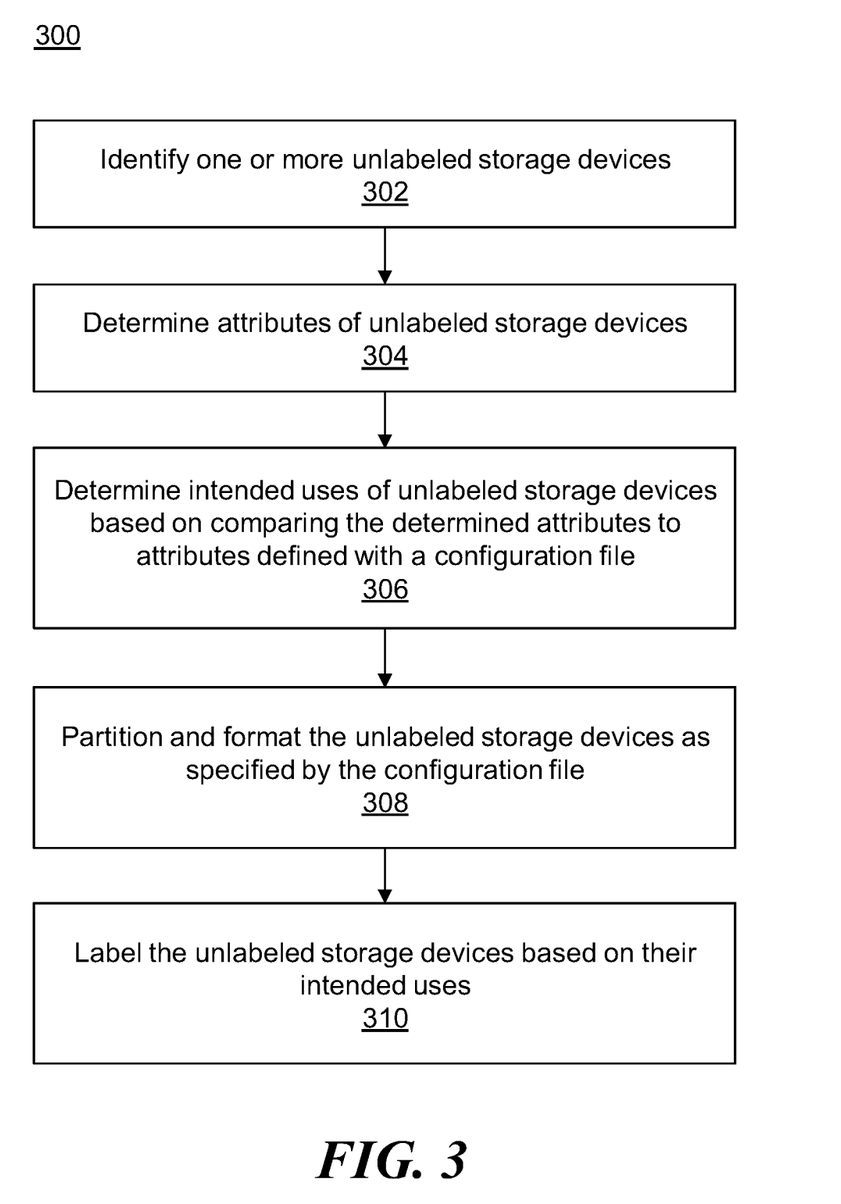
FIGS. 3 and 4 are flow diagrams showing illustrative processes for identifying storage devices during system installation, according to some embodiments of the disclosure.

FIG. 3 shows an example of a process 300 for identifying storage devices during system installation. Illustrative process 300 can be implemented within and/or utilized by installation agent 218 of FIG. 2, for example.

At block 302, one or more unlabeled storage devices accessible to a node can be identified. The unlabeled storage devices can include "raw" storage devices/LUNs, as previously discussed. In the case of a Linux system, block 302 may include obtaining a listing of device within the "/dev" directory, and then running the "blkid" command on each such device to determine whether it has previously been assigned label.

At block 304, for each of the unlabeled storage devices, one or more attributes can be determined (e.g., retrieved from the devices). For example, a size/capacity and a WWN can be determined for one or more of the unlabeled storage devices.

At block 306, intended uses of the unlabeled storage devices by the node can be determined based on comparing the determined attributes to attributes defined within a configuration file (e.g., configuration file 220 of FIG. 2). In some cases, at least a portion of the process shown in FIG. 4 may be utilized at block 306.

At block 308, labels can be generated for the unlabeled storage devices based in least in part on the determined intended uses. In some cases, the labels can have a hierarchical format such as "<PurposeLabel>-<DeviceLabel>-<PartitionLabel>," where the values of "PurposeLabel," "DeviceLabel," and "PartitionLabel" can be defined within the configuration file.

At block 310, the generated labels can be applied to their respective storage devices (e.g., using the "e2label" command in the case of a Linux systems). In some embodiments, prior to applying the labels, the unlabeled storage devices can be automatically partitioned and formatted using settings specified within the configuration file. Of note, labels are persistent across reboots. Thus, post installation (e.g., for entire lifecycle of the host) the applied device labels can be used by one or more lookup functions to identify the devices by the intended purposes (e.g., using lookup functions 222 of FIG. 2).

In some embodiments, process 300 can further include updating a file system mount table (e.g., table 216 of FIG. 2) to reference the labels generated for the storage devices. For example, process 300 can automatically update the "/etc/fstab" system file on a Linux system such that the storage device labels are mapped to well-defined file system paths.

Figure 4:
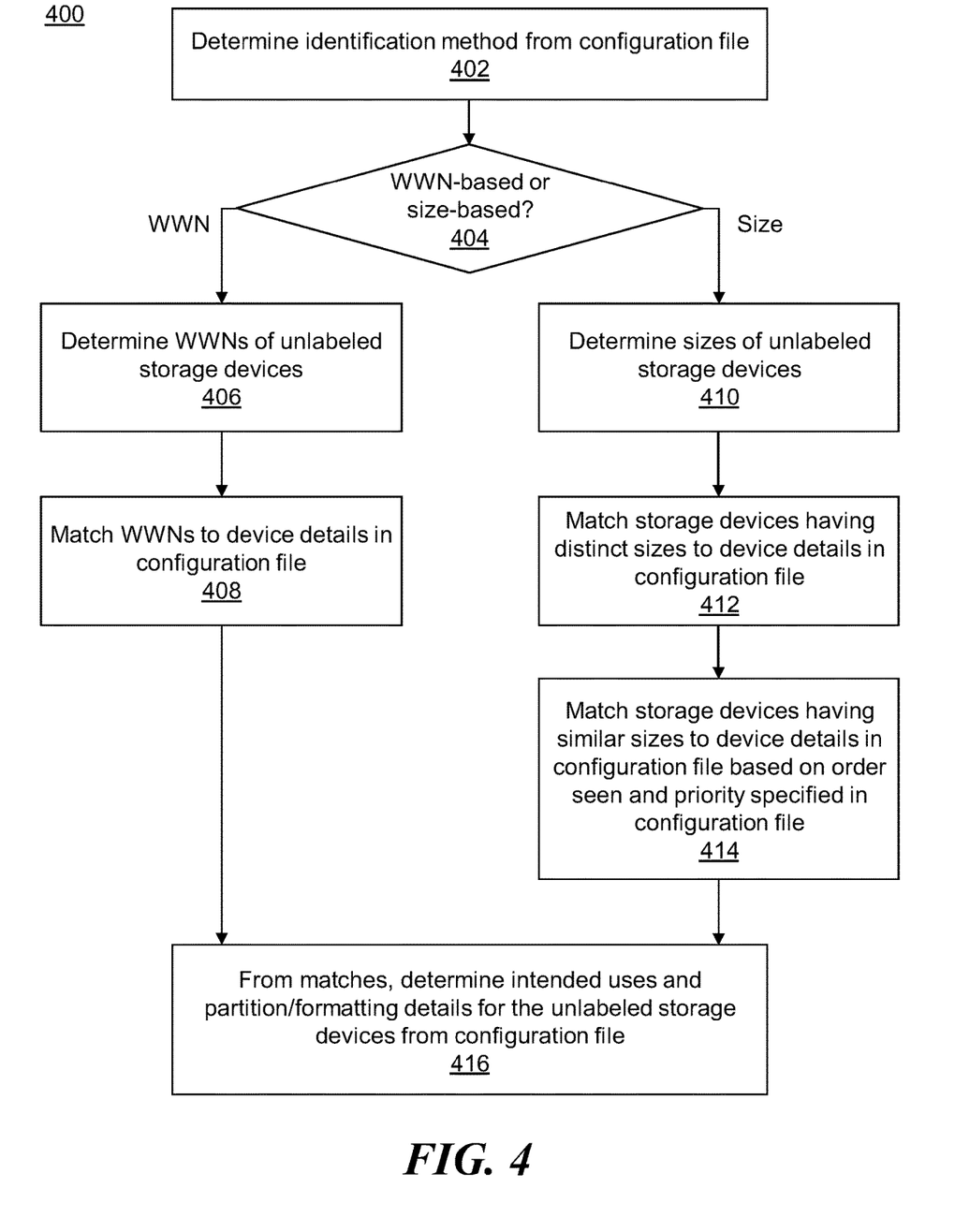

FIG. 4 shows another process 400 for identifying storage devices during system installation. Illustrative process 400 can be implemented within and/or utilized by installation agent 218 of FIG. 2, for example. In some embodiments, process 400 of FIG. 4 may be used in combination with process 300 of FIG. 3. For example, at least a portion of process 400 may be performed by blocks 304 and/or 306 of FIG. 3.

At block 402, an identification method can be determined from a configuration file (e.g., configuration file 220 of FIG. 2). The identification method can be one of WWN-based or size-based. If, at block 404, a WWN-based method is determined, then processing may proceed to block 406. Otherwise, processing may proceed to block 410.

At block 406, for WWN-based identification, the WWNs of the unlabeled storage devices can be determined. Then, at block 408, the WWNs can be matched to device details in the configuration file. For example, referring to the illustrative configuration file shown above, a WWN of an unlabeled storage device may be compared to each of the device "WWN" values in the configuration file until a match is found.

At block 410, for size-based identification, the sizes/capacities of the unlabeled storage devices can be determined. In the case of a Linux system, the "fdisk" command, "lsblk" command, or equivalent can be used. It is possible that two or more of the storage devices have identical sizes or substantially similar sizes (e.g., their sizes may differ by no more than 1%, 5%, 10%, etc.). On the other hand, different storage devices may have distinct sizes. Process 400 can treat these two cases separately, as discussed next.

At block 412, for the unlabeled storage devices that have distinct sizes, those sizes can be matched against device details in the configuration file. For example, referring to the illustrative configuration file shown above, the size of an unlabeled storage device can be compared to each of the device "Size" fields values in the configuration file until a match is found. If the configuration file specifies multiple devices as having the same/similar sizes, the devices may be matched in order of priority (i.e., using the "Priority" field in the configuration file). That is, for a given storage device, its purpose can be determined based on the highest priority device in the configuration file that has not yet been matched/used. To that end, block 412 can include keeping track of which devices from the configuration file have already been matched (e.g., using an in-memory data structure).

At block 414, groups of unlabeled storage devices that have identical/similar sizes can be matched against device details in the configuration file based on the order in which those devices were identified (or "seen") by the node and device priority as defined in the configuration file. For example, two devices "/dev/sda" and "/dev/sdb" are accessible to the node and are determined to have identical/similar sizes, then block 414 can first attempt to match "/dev/sda" to a device in the configuration file having the same size, and then attempt to match "/dev/sdb" (based on the assumption that the suffixes "a" and "b" correspond to the order in which the devices were identified by the node or, more particularly, by its OS). Other techniques can be used to determine the order in which the storage devices are matched. Similar to block 412, block 414 can also keep track of which devices from the configuration file have already been matched/used so that multiple devices attached to the node are not matched to the same device defined in the configuration file.

At block 416, based on the matches found using the WWN-based or sized-based identification methods, the intended uses of the unlabeled storage devices can be determined from the configuration file. In addition, partitioning and formatting details for those devices can be determined from the configuration file.

FIG. 5 shows an illustrative server device 500 that may implement various features and processes as described. The server device 500 may be implemented on any electronic device that runs software applications derived from compiled instructions, including without limitation personal computers, servers, smart phones, media players, electronic tablets, game consoles, email devices, etc. In some implementations, the server device 500 may include one or more processors 502, volatile memory 504, non-volatile memory 506, and one or more peripherals 508. These components may be interconnected by one or more computer buses 510.

Processor(s) 502 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Bus 510 may be any known internal or external bus technology, including but not limited to ISA, EISA, PCI, PCI Express, NuBus, USB, Serial ATA or FireWire. Volatile memory 504 may include, for example, SDRAM. Processor 502 may receive instructions and data from a read-only memory or a random access memory or both. The essential elements of a computer may include a processor for executing instructions and one or more memories for storing instructions and data.

Non-volatile memory 506 may include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 506 may store various computer instructions including operating system instructions 512, communication instructions 514, application instructions 516, and application data 517. Operating system instructions 512 may include instructions for implementing an operating system (e.g., Mac OS®, Windows®, or Linux). The operating system may be multi-user, multiprocessing, multitasking, multithreading, real-time, and the like. Communication instructions 514 may include network communications instructions, for example, software for implementing communication protocols, such as TCP/IP, HTTP, Ethernet, telephony, etc.

Peripherals 508 may be included within the server device 500 or operatively coupled to communicate with the server device 500. Peripherals 508 may include, for example, network interfaces 518, input devices 520, and storage devices 522. Network interfaces may include, for example, an Ethernet or Wi-Fi adapter. Input devices 520 may be any known input device technology, including but not limited to a keyboard (including a virtual keyboard), mouse, trackball, and touch-sensitive pad or display. Storage devices 522 may include one or more mass storage devices for storing data files; such devices include magnetic disks, such as internal hard disks and removable disks; magneto-optical disks; and optical disks.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate. The program logic may be run on a physical or virtual processor. The program logic may be run across one or more physical or virtual processors.

As used herein, the terms "processor" and "controller" are used to describe electronic circuitry that performs a function, an operation, or a sequence of operations. The function, operation, or sequence of operations can be hard coded into the electronic circuit or soft coded by way of instructions held in a memory device. The function, operation, or sequence of operations can be performed using digital values or using analog signals. In some embodiments, the processor or controller can be embodied in an application specific integrated circuit (ASIC), which can be an analog ASIC or a digital ASIC, in a microprocessor with associated program memory and/or in a discrete electronic circuit, which can be analog or digital. A processor or controller can contain internal processors or modules that perform portions of the function, operation, or sequence of operations. Similarly, a module can contain internal processors or internal modules that perform portions of the function, operation, or sequence of operations of the module.

The subject matter described herein can be implemented in digital electronic circuitry, or in computer software, firmware, or hardware, including the structural means disclosed herein and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this disclosure, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by ways of example semiconductor memory devices, such as EPROM, EEPROM, flash memory device, or magnetic disks. The processor and the memory can be supplemented by, or incorporated in, special purpose logic circuitry.

In the foregoing detailed description, various features are grouped together in one or more individual embodiments for the purpose of streamlining the disclosure. This method of disclosure is not to be interpreted as reflecting an intention that each claim requires more features than are expressly recited therein. Rather, inventive aspects may lie in less than all features of each disclosed embodiment.

References in the disclosure to "one embodiment," "an embodiment," "some embodiments," or variants of such phrases indicate that the embodiment(s) described can include a particular feature, structure, or characteristic, but every embodiment can include the particular feature, structure, or characteristic. Moreover, such phrases are not necessarily referring to the same embodiment(s). Further, when a particular feature, structure, or characteristic is described in connection knowledge of one skilled in the art to affect such feature, structure, or characteristic in connection with other embodiments whether or not explicitly described.

The disclosed subject matter is not limited in its application to the details of construction and to the arrangements of the components set forth in the following description or illustrated in the drawings. The disclosed subject matter is capable of other embodiments and of being practiced and carried out in various ways. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

All publications and references cited herein are expressly incorporated herein by reference in their entirety.

The invention claimed is:

1. A computer-implemented method comprising:
    identifying a plurality of storage devices accessible to a node of a computer cluster, the storage devices being identified as not having labels;
    determining one or more attributes of individual ones of the storage devices;
    determining, by the node, intended uses of the storage devices based on comparing the determined attributes to attributes defined within a configuration file;
    generating labels for the storage devices based at least in part on the determined intended uses; and
    applying the labels to the storage devices.

2. The computer-implemented method of claim 1, further comprising:
    partitioning and formatting the storage devices using settings specified within the configuration file.

3. The computer-implemented method of claim 1, wherein the generating of the labels for the storage devices includes generating labels that indicate the determined intended uses in addition to device labels and partition labels specified within the configuration file.

4. The computer-implemented method of claim 1, wherein the determining of the one or more attributes of individual ones of the storage devices includes determining sizes of individual ones of the storage devices, wherein the determining of the intended uses of the storage devices includes matching the determined sizes of the storage devices to sizes specified within the configuration file.

5. The computer-implemented method of claim 4, wherein at least two of the storage devices have a same size, wherein the least two of the storage devices are matched based on an order in which they were identified by the node.

6. The computer-implemented method of claim 1, wherein the determining of the one or more attributes of individual ones of the storage devices includes determining World Wide Names (WWNs) of individual ones of the storage devices, wherein the determining of the intended uses of the storage devices includes matching the determined WWNs of the storage devices to WWNs specified within the configuration file.

7. The computer-implemented method of claim 1, further comprising:
    receiving, by the node, a request to identify storage devices that have a given intended use; and
    identifying one or more of the storage devices accessible to the node having the given intended use based on the applied labels.

8. A computing device comprising:
    a processor; and
    a non-volatile memory storing computer program code that when executed on the processor causes the processor to execute a process comprising:
        identifying a plurality of storage devices accessible to the computing device, the storage devices being identified as not having labels;
        determining one or more attributes of individual ones of the storage devices;
        determining intended uses of the storage devices based on comparing the determined attributes to attributes defined within a configuration file;
        generating labels for the storage devices based at least in part on the determined intended uses; and
        applying the labels to the storage devices.

9. The computing device of claim 8, the process further comprising:
    partitioning and formatting the storage devices using settings specified within the configuration file.

10. The computing device of claim 8, wherein the generating of the labels for the storage devices includes generating labels that indicate the determined intended uses in addition to device labels and partition labels specified within the configuration file.

11. The computing device of claim 8, wherein the determining of the one or more attributes of individual ones of the storage devices includes determining sizes of individual ones of the storage devices, wherein the determining of the intended uses of the storage devices includes matching the determined sizes of the storage devices to sizes specified within the configuration file.

12. The computing device of claim 11, wherein at least two of the storage devices have a same size, wherein the least two of the storage devices are matched based on an order in which they were identified by the computing device.

13. The computing device of claim 8, wherein the determining of the one or more attributes of individual ones of the storage devices includes determining World Wide Names (WWNs) of individual ones of the storage devices, wherein the determining of the intended uses of the storage devices includes matching the determined WWNs of the storage devices to WWNs specified within the configuration file.

14. The computing device of claim 8, the process further comprising:

receiving, by the node, a request to identify storage devices that have a given intended use; and identifying one or more of the storage devices accessible to the node having the given intended use based on the applied labels.

15. A non-transitory machine-readable medium encoding instructions that when executed by one or more processors cause a process to be carried out, the process comprising:

identifying a plurality of storage devices accessible to a node of a computer cluster, the storage devices being identified as not having labels;

determining one or more attributes of individual ones of the storage devices;

determining, by the node, intended uses of the storage devices based on comparing the determined attributes to attributes defined within a configuration file;

generating labels for the storage devices based at least in part on the determined intended uses; and applying the labels to the storage devices.

16. The non-transitory machine-readable medium of claim 15, the process further comprising:

partitioning and formatting the storage devices using settings specified within the configuration file.

17. The non-transitory machine-readable medium of claim 15, wherein the generating of the labels for the storage devices includes generating labels that indicate the determined intended uses in addition to device labels and partition labels specified within the configuration file.

18. The non-transitory machine-readable medium of claim 15, wherein the determining of the one or more attributes of individual ones of the storage devices includes determining sizes of individual ones of the storage devices, wherein the determining of the intended uses of the storage devices includes matching the determined sizes of the storage devices to sizes specified within the configuration file.

19. The non-transitory machine-readable medium of claim 18, wherein at least two of the storage devices have a same size, wherein the least two of the storage devices are matched based on an order in which they were identified by the node.

20. The non-transitory machine-readable medium of claim 15, wherein the determining of the one or more attributes of individual ones of the storage devices includes determining World Wide Names (WWNs) of individual ones of the storage devices, wherein the determining of the intended uses of the storage devices includes matching the determined WWNs of the storage devices to WWNs specified within the configuration file.

* * * * *